US010855764B2

(12) United States Patent
Ueda et al.

(10) Patent No.: US 10,855,764 B2
(45) Date of Patent: Dec. 1, 2020

(54) MULTI-LOCATION EXCHANGE OF MEDICAL IMAGES AND DATA

(71) Applicant: Konica Minolta Healthcare Americas, Inc., Wayne, NJ (US)

(72) Inventors: Yutaka Ueda, Wayne, NJ (US); Takao Shiibashi, Wayne, NJ (US)

(73) Assignee: Konica Minolta Healthcare Americas, Inc., Wayne, NJ (US)

( * ) Notice: Subject to any disclaimer, the term of this patent is extended or adjusted under 35 U.S.C. 154(b) by 248 days.

(21) Appl. No.: 15/434,961

(22) Filed: Feb. 16, 2017

(65) Prior Publication Data

US 2018/0234497 A1    Aug. 16, 2018

(51) Int. Cl.
*H04L 29/08*    (2006.01)

(52) U.S. Cl.
CPC .......... *H04L 67/1097* (2013.01); *H04L 67/12* (2013.01); *H04L 67/06* (2013.01)

(58) Field of Classification Search
CPC ...... H04L 67/1097; H04L 67/06; H04L 67/12
See application file for complete search history.

(56) References Cited

U.S. PATENT DOCUMENTS

| 8,799,358 | B2 | 8/2014 | Lingley | |
| 2008/0189496 | A1* | 8/2008 | Raczynski | G06F 19/321 |
| | | | | 711/161 |
| 2009/0125827 | A1* | 5/2009 | Zeigler | G06F 17/30899 |
| | | | | 715/765 |
| 2011/0010433 | A1* | 1/2011 | Wilburn | G06Q 30/02 |
| | | | | 709/219 |
| 2011/0015941 | A1* | 1/2011 | Backhaus | G06F 19/321 |
| | | | | 705/2 |
| 2011/0191767 | A1* | 8/2011 | Pinsky | G06F 9/445 |
| | | | | 717/176 |
| 2013/0179192 | A1* | 7/2013 | Rajendran | G06F 19/321 |
| | | | | 705/3 |
| 2013/0241693 | A1* | 9/2013 | Miyamoto | H04W 12/06 |
| | | | | 340/5.6 |
| 2015/0078682 | A1* | 3/2015 | Dutta | G06F 19/321 |
| | | | | 382/305 |

(Continued)

FOREIGN PATENT DOCUMENTS

CN    103714230    *    4/2014    ............. G06F 19/00

*Primary Examiner* — Shean Tokuta
*Assistant Examiner* — Juan C Turriate Gastulo
(74) *Attorney, Agent, or Firm* — Osha Bergman Watanabe & Burton LLP

(57) ABSTRACT

A method to exchange medical data between a cloud repository on a cloud server and a plurality of local repositories on a plurality of local servers connected to the cloud server. The plurality of local servers comprises a first local server and the plurality of local repositories comprises a first local repository on the first local server. The method includes, causing the first local server to: transmit an image retrieval request to the cloud server, receive the medical image generated by the cloud server or an instruction from the cloud server to generate the medical image locally, and display the generated medical image on a display. The image retrieval request causes the cloud server to determine whether raw image data associated with the image retrieval request is stored in the cloud repository or locally in the first local repository.

20 Claims, 12 Drawing Sheets

(56) References Cited

U.S. PATENT DOCUMENTS

| | | | |
|---|---|---|---|
| 2015/0091778 A1* | 4/2015 | Day | G06F 3/1446 345/1.3 |
| 2015/0149196 A1* | 5/2015 | Ohad | G06F 19/324 705/2 |
| 2015/0319332 A1* | 11/2015 | Miyashita | H04N 1/00931 358/403 |
| 2016/0316015 A1* | 10/2016 | Keating | H04L 67/1097 |

* cited by examiner

300

Automatic Deletion Period

- 3 months ago
- 6 months ago
- 1 year ago
- 2 years ago
- 3 years ago
- 5 years ago Modality type for auto delete

DR
US
CT
MR
ES
PT

DR
US

● Images with bookmarks are excluded from deletion.

Time to execute image deletion

1 : 00

Frequency of Image Deletion

Everyday

Save

Cancel

FIG. 3

MULTI-LOCATION EXCHANGE OF MEDICAL IMAGES AND DATA

BACKGROUND

Medical images and medical data play a crucial role in the diagnosis of a patient. Healthcare facilities (e.g., hospitals) have realized the benefits of electronically storing medical images and medical data. The digitalization of the medical images and data not only enables users to easily access medical images and medical data, but also enables the images and data to be easily exchanged between multiple healthcare facilities.

In the healthcare industry, the use of a system known as a Picture Archiving and Communications System ("PACS") is becoming increasing popular for convenient storage and access of medical images. Generally, PACS comprises a multitude of devices working cooperatively to digitally capture, store, manage, distribute, and display medical images generated by various imaging modalities, such as computed tomography (CT), magnetic resonance imaging (MRI), position emission tomography (PET), ultrasound, X-ray, etc. PACS allows various healthcare facilities to share all types of images captured internally or externally.

More recently, cloud-based PACS have emerged as a way to improve efficiency and accessibility of traditional PACS. In general, a "cloud" can be understood as an online storage system that provides remote, on-demand access of computing resources and data over the Internet to multiple computers and devices in various locations. The cloud provides a medium that allows healthcare facilities to store data that healthcare facilities do not want to store locally. Cloud-based PACS may be provided by vendors who use remote or off-site data centers in various locations for storage of medical images.

SUMMARY

In general, in one aspect, the invention relates to a method to exchange medical data between a cloud repository on a cloud server and a plurality of local repositories on a plurality of local servers connected to the cloud server. The plurality of local servers comprises a first local server and the plurality of local repositories comprises a first local repository on the first local server. The method comprises causing the first local server to: transmit, in response to a request by a user to access a medical image associated with a predetermined patient, an image retrieval request to the cloud server, wherein the image retrieval request is associated with the predetermined patient and causes the cloud server to determine whether raw image data associated with the image retrieval request is stored in the cloud repository or locally in the first local repository; based on the determination by the cloud server, receive the medical image generated by the cloud server using the raw image data if the raw image data is stored in the cloud repository, or receive an instruction from the cloud server to generate the medical image locally using the raw image data if the raw image data is stored on the first local repository, and display the generated medical image on a display.

In general, in one aspect, the invention relates to a non-transitory computer-readable medium (CRM) storing instructions that cause a first local server coupled to a computer to perform an operation to exchange medical data between a cloud repository on a cloud server and a plurality of local repositories on a plurality of local servers connected to the cloud server. The plurality of local servers comprises a first local server and the plurality of local repositories comprises a first local repository on the first local server. The operation comprises the first local server to: transmit, in response to a request by a user to access a medical image associated with a predetermined patient, an image retrieval request to the cloud server, wherein the image retrieval request is associated with the predetermined patient and causes the cloud server to determine whether raw image data associated with the image retrieval request is stored in the cloud repository or locally in the first local repository; based on the determination by the cloud server, receive the medical image generated by the cloud server using the raw image data if the raw image data is stored in the cloud repository, or receive an instruction from the cloud server to generate the medical image locally using the raw image data if the raw image data is stored on the first local repository, and display the generated medical image on a display.

In general, in one aspect, the invention relates to a system that exchanges medical data. The system comprises: a local server connected to a cloud server; and a local repository on the local server. The local server: transmits, in response to a request by a user to access a medical image associated with a predetermined patient, an image retrieval request to the cloud server, wherein the image retrieval request is associated with the predetermined patient and causes the cloud server to determine whether raw image data associated with the image retrieval request is stored in the cloud repository or locally in the local repository; based on the determination by the cloud server, receives the medical image generated by the cloud server using the raw image data if the raw image data is stored in the cloud repository, or receives an instruction from the cloud server to generate the medical image locally using the raw image data if the raw image data is stored on the local repository, and displays the generated medical image on a display.

Other aspects and advantages of the invention will be apparent from the following description and the appended claims.

BRIEF DESCRIPTION OF DRAWINGS

FIG. 3 shows a user interface in accordance with one or more embodiments.

DETAILED DESCRIPTION

Figure 1A:
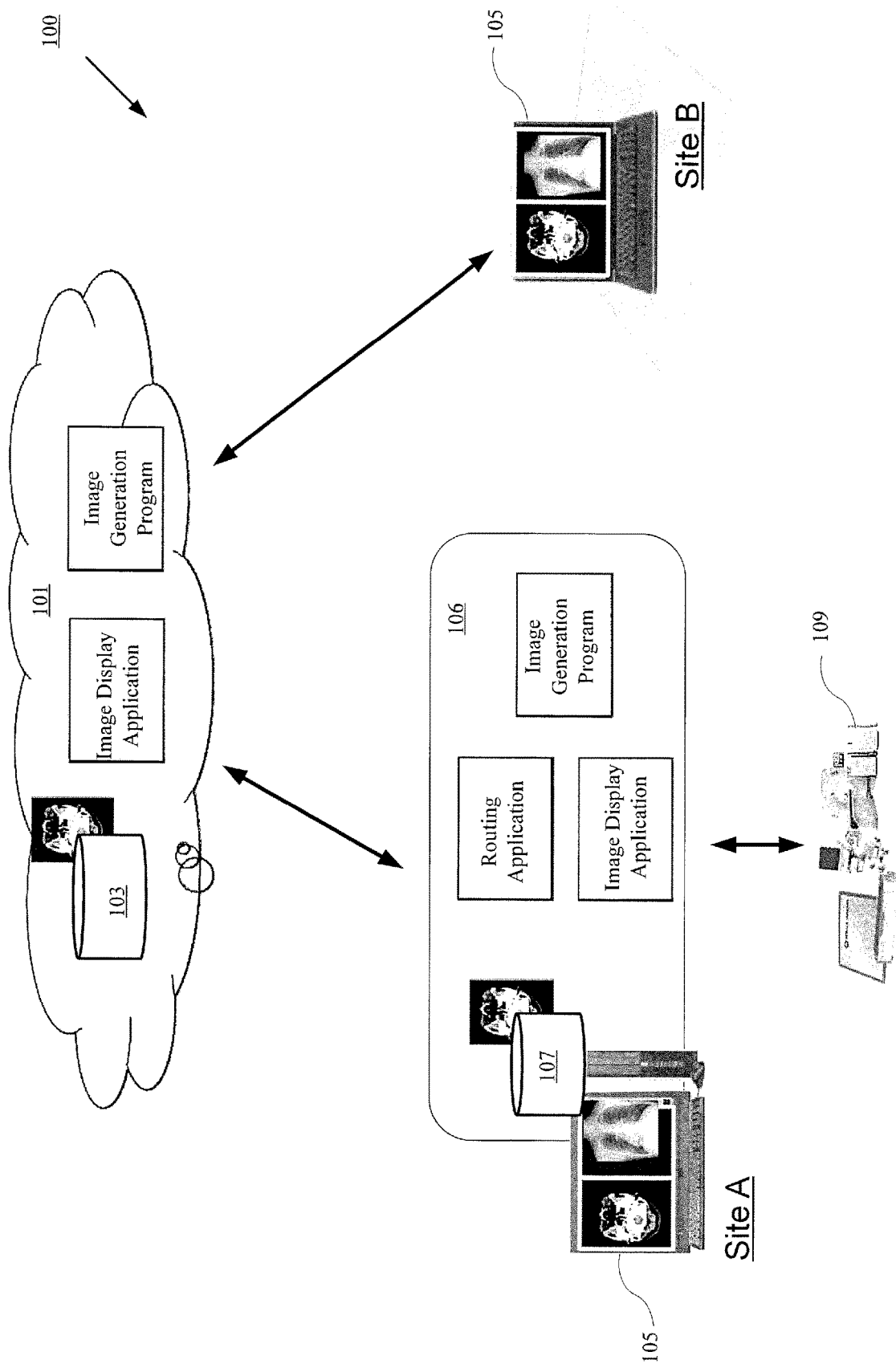
FIGS. 1A and 1B show a system in accordance with one or more embodiments.

Specific embodiments will now be described in detail with reference to the accompanying figures. Like elements in the various figures are denoted by like reference numerals for consistency. Like elements may not be labeled in all figures for the sake of simplicity.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although multiple dependent claims are not introduced, it would be apparent to one of ordinary skill in that that the subject matter of the dependent claims of one or more embodiments may be combined with other dependent claims.

In general, one or more embodiments of the invention relate to a cloud-based PACS and provide a method, a non-transitory computer readable medium, and a system that can efficiently offload burden placed on a cloud server configured for a multi-location exchange of medical images and data.

With the cloud-based PACS according to one or more embodiments, medical images and data are exchanged among various healthcare facilities that are given permission to access a cloud data repository or database ("cloud repository") on a cloud server, such as facilities within the same hospital group. In such an environment, for example, all the users of the cloud-based PACS (e.g., healthcare professionals) would be able to send requests to a cloud server to retrieve a patient's medical images and data obtained at the other healthcare facilities that are "in-network" (i.e., having permission to access the same portion of the cloud repository).

According to one or more embodiments, in response to a user request, the cloud server may generate the medical images using medical image data ("raw image data") stored in the cloud repository. The cloud server may receive multiple such requests simultaneously. However, in one or more embodiments, at least some of the in-network healthcare facilities are configured to store, at least temporarily, locally-obtained raw image data in on-site or local data repositories or databases ("local repositories") and to generate medical images from the raw image data using a locally-stored image generation program. Thus, before generating the requested medical images, the cloud server may first communicate with the in-network healthcare facilities to determine if any of the facilities are capable of fulfilling their own requests locally without the need to utilize the resources of the cloud server. Then, by instructing those capable facilities to generate their own medical images, the cloud server can process all the requests in a more timely and efficient manner, even when network connections are slow and/or a large number of users simultaneously send requests to the cloud server. As a result, one or more embodiments of the invention can enhance the performance collectively experienced by multiple users who may be trying to access (e.g., use or view) medical images from different user devices within the same facility or in different facilities.

According to one or more embodiments, not all raw image data generated at each such healthcare facility need necessarily be stored in the respective local repositories; rather, only data that is necessary or is of interest to the respective facilities can be stored locally. For example, a facility may not want its local repository filled or local server burdened with medical images that are not frequently accessed. Further, certain in-network healthcare facilities may not have the necessary resources (e.g., bandwidth, proper equipment, etc.) to generate the medical images locally.

According to one or more embodiments, when a user at one facility sends an image retrieval request from a user device ("local computer") of an in-network facility to the cloud server (either directly from the local computer or via a local server connected to the local computer), the cloud server will generate and transmit the requested medical images to the facility if it is determined that the raw image data associated with the requested medical images are only stored in the cloud repository. On the other hand, if the raw image data associated with the requested medical images are determined to be available in the local repository of the facility, the cloud server sends an instruction back to the local computer instructing the local computer to generate the medical images locally. By performing this process for each image retrieval request made by the different in-network facilities, one or more embodiments of the invention enable the burden placed upon the cloud server to be offloaded between the in-network healthcare facilities, resulting in a higher and more stable performance for all users accessing the cloud server.

Figure 1B:
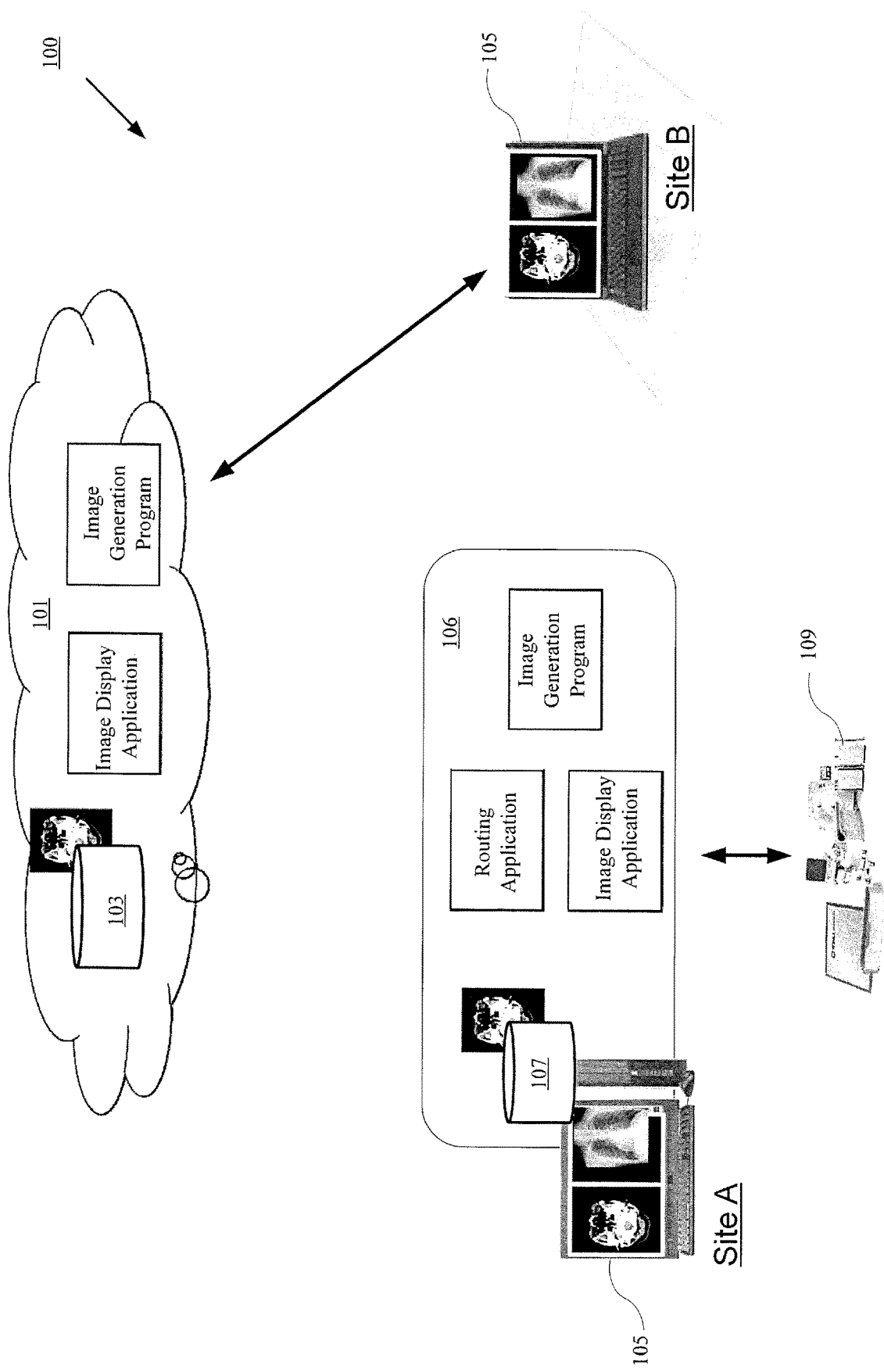

FIGS. 1A and 1B show a system (100) in accordance with one or more embodiments of the invention. As shown in FIGS. 1A and 1B, the system (100) includes a cloud server (101) that includes a cloud repository (103), multiple local computers (105), and a local server (106) with a local repository (107) associated with different in-network healthcare facilities. The local server (106) (e.g., application proxy servers (APS)) and the multiple local computers (105) are authorized to access the cloud server (101) to request medical images from the cloud server (101). In one or more embodiments, if the local server (106) is available at an in-network healthcare facility, the multiple local computers (105) may be coupled to the local server (106) and access the cloud server (101) through the local server (106).

In one or more embodiments, each of the healthcare facilities (Site A, Site B) may be in any location and may be a facility that provides medical care such as a public hospital, a private hospital, a medical clinic, a dental clinic, medical portable clinic, a medical tent, a temporary medical station, etc. FIGS. 1A and 1B show only Sites A and B, but this is for ease of illustration. One or more embodiments of the invention may have many more in-network facilities. Further, FIGS. 1A and 1B show only one facility (Site A) with a single local server (106), but this is also for ease of illustration. One or more embodiments of the invention may have more than one in-network healthcare facility that includes a local server (106), and more than one local server (106) may be disposed in one facility.

In one or more embodiments, the cloud server (101) with the cloud repository (103) may be operated by a vendor providing the cloud-based PACS or another third-party associated with such a vendor. In one or more embodiments, the cloud server (101) is a physical and/or virtual computing infrastructure that performs application and information processing. For example, the cloud server (101) may be a virtual server or a physical server accessed remotely via the Internet. In one or more embodiments, the cloud repository (103) is an online repository of data. For example, the cloud repository may be a virtual data room (VDR) or a database (or group of databases) accessed remotely via the Internet.

In one or more embodiments, the cloud server (101) is configured to receive medical image data ("raw image data") transmitted from the local server (106) and store the raw image data in the cloud repository (103) as remote data.

In one or more embodiments, each of the local computers (105) may correspond to a personal computer (PC), a laptop, a mobile computing device (e.g., tablet PC, smartphone, etc.), a server, a mainframe, a kiosk, etc. The local computers (105) are operated by medical professionals associated with the respective healthcare facilities and are configured to exchange medical images and raw image data with the cloud server (101). In one or more embodiments, one of the multiple local computers (105) at an in-network healthcare facility may be configured as the local server (106).

In one or more embodiments, the local server (106) may be a computing device that includes one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities.

As also shown in FIGS. 1A and 1B, the cloud server is provided with a remote image display application ("remote IDA") and a remote image generation program ("remote IGP"). The local server (106) may be provided with a routing application that enables the local server (106) to access the cloud server. The local server (106) may also be provided with a local image display application ("local IDA") and a local image generation program ("local IGP"). The routing application, the local IDA, and the local IGP may be provided by the vendor that operates the cloud server (101). The local computers (105) coupled to the local server (106) may access the functions of the routing application, the local IDA, and the local IGP. This eliminates the need for the routing application, the local IDA, and the local IGP to be installed in each individual local computer (105).

In one or more embodiments, the routing application, the local IDA, and the local IGP may be provided by a third-party associated with the vendor. The routing application, the local IDA, and the local IGP may be stored in the local server (106) and installed as plug-ins of a web-browser based application with a graphical user interface ("GUI") that allows the local computers (105) coupled to the local server (106) to access the cloud server (101), receive data from an external local source, and to generate medical images.

In one or more embodiments, the routing application is configured as the main relay point that enables the local server (106) to transmit medical image retrieval requests to and receive instructions from the cloud server (101). The local IDA and the remote IDA are configured to receive raw image data from an external source and to receive medical image retrieval requests sent by the local server (106). The external source may be an imaging modality (109), an external device, or an external media such as a CD, DVD, USB, etc. The external device may be a device such as a digital signal conditioner (DSC), a smartphone, etc. The external media maybe a medium that stores data that can be inserted into an input interface of the local server (106) such as a CD, a DVD, a USB, etc.

In one or more embodiments, the remote IGP and local IGP are configured to convert raw image data into an image in a format such as JPEG (Joint Photographic Expert Group), JPEG 2000, PNG (Portable Network Graphics), GIF (Graphics Interchange Format), TIFF (Tagged Image File Format), etc. The raw image data may be in a Digital Imaging and Communications in Medicine Format (DICOM-format). In one or more embodiments, DICOM may be the universal image format for implementing the system (100).

As also shown in FIGS. 1A and 1B, the local server (106) may be coupled to the imaging modality (109). The imaging modality (109) may be any type of medical imaging device that is able to generate raw image data, such as DICOM-format data, that are used to generate medical images that provide a diagnosis of a patient. Examples of the imaging modality may be computed tomography (CT), magnetic resonance imaging (MRI), position emission tomography (PET), ultrasound (US), X-ray, digital radiography (DR), etc.

In one or more embodiments, the routing application, the local IDA, the local repository (107), and the local IGP can be provided on the local computers (105) instead of the local server (106). In one or more embodiments, the local computers (105) that are not coupled to the local server (106) or do not have a local server (106) may include only the routing application.

FIG. 1A shows an example in accordance with one or more embodiments where the connection between the in-network healthcare facilities and the cloud server (101) is stable. In this state, the multiple in-network healthcare facilities may communicate bilaterally with the cloud server (101). As shown in FIG. 1A, the in-network healthcare facilities may transmit locally-obtained raw image data to the cloud server (101) to be stored as remote data in the cloud repository (103) accessible to other in-network healthcare facilities.

In one or more embodiments, the in-network healthcare facilities with similar setup as Site A may retrieve raw image data from the cloud server (101) to be stored as local data in their respective local repositories (107) or receive medical images to be displayed by the local computers (105) coupled to the local server (106). The healthcare facilities may also access the raw image data stored in the local repositories (107) to generate a medical image locally using the local IGP.

In one or more embodiments, when the connection between the in-network healthcare facilities with similar setup as Site A and the cloud server (101) is stable, the local server (106) is able to transmit, through the routing application, a medical image retrieval request to the cloud server (101). Upon receipt of the request, the cloud server (101) will determine, based on information from the raw image data stored in the cloud repository (103), where the raw image data associated with requested medical images are stored. In one or more embodiments, the cloud server (101) will always have a copy of the raw image data associated with the requested medical images.

In one or more embodiments, if the cloud server (101) determines that the raw image data associated with the requested medical images are only stored in the cloud repository (103), the cloud server (101) will retrieve the raw image data from the cloud repository (103) and generate the medical images using the remote IGP. The cloud server (101) then transmits the generated medical images to the respective local server (106) that sent the image retrieval request.

In one or more embodiments, if the cloud server (101) determines that the raw image data associated with the requested medical images are stored as local data in the local repositories (107) of the local server (106) that sent the image retrieval request, the cloud server (101) will transmit an instruction to the local server (106) to generate the requested medical images locally by the local IGP using the local data.

In one or more embodiments, not all the remote data stored in the cloud repository (103) need to be retrieved by the in-network healthcare facilities with similar setup as Site A to be stored as local data. The remote data to be retrieved and stored as local data may vary based on the size and need of the healthcare facility or on the preferences of the user of the local computers (105) (e.g., healthcare professionals). For example, the remote data to be retrieved and stored as local data in the local repositories (107) of certain in-network healthcare facilities may be based on specific individuals who are patients of those facilities. Thus, if a particular individual is not a patient of a particular in-network healthcare facility, that healthcare facility may not retrieve and store that patient's raw image data from the cloud server (101) as local data. Further, the remote data to be retrieved and stored may be based on data of a particular patient that is frequently used by the healthcare professionals. Further still, the remote data may be stored as local data only temporarily; for example, data older than a particular timeframe may be purged. These options may be particularly useful for smaller healthcare facilities with smaller local repositories (107) with limited storage and processing power.

In one or more embodiments, users of the local computers (105) at each in-network healthcare facility with similar setup as Site A may view the medical images retrieved on the cloud repository (103) through a web-browser based application with a GUI installed on the local computers (105) coupled to the local server (106). In one or more embodiments, the local server (106) may automatically update the local data in the local repository (107) with the cloud repository (103) data in case the remote data has been updated by another healthcare facility.

For example, an individual may be a patient at multiple in-network healthcare facilities. Each of these in-network healthcare facilities may store the individual's raw image data as local data. In one or more embodiments, the individual's raw image data are updated in the cloud repository (103) by one of the in-network healthcare facilities, the other in-network healthcare facilities where the individual is also a patient may automatically retrieve (synchronize) the individual's updated images and data to keep the local data in the local repository (107) up-to-date. The automatic updating of the cloud repository (103) and/or synchronization of the pertinent local repositories (107) may be triggered, for example, at predetermined intervals set by the users of the local server (106).

In one or more embodiments as shown in FIG. 1A, the in-network healthcare facilities with similar setup as Site B may directly retrieve medical images from the cloud server (101) to be displayed on the local computer (105). The local computer (105) transmits, through the routing application, a medical image retrieval request to the cloud server (101). Upon receipt of the image retrieval request by the cloud server (101), the cloud server (101) will generate the requested medical images with the remote IGP using remote data associated with the requested medical images that are stored in the cloud repository (103). Once the medical images are generated in the cloud server (101), the cloud server (101) will transmit the medical images to the local computers (105) to be displayed by the local computer (105).

FIG. 1B shows an example in accordance with one or more embodiments where a connection between one of the in-network healthcare facilities with similar setup as Site A and the cloud server (101) is disconnected. In this state, the application may automatically configure the local server (106) at the disconnected healthcare facility to access the local data stored in the local repository (107). In one or more embodiments, the disconnected healthcare facility temporarily stores into the local repository (107) raw image data taken during the time of disconnection.

In one or more embodiments, where a connection between one of the in-network healthcare facilities and the cloud server (101) is disconnected, the routing application will direct an image retrieval request by the local server (106) to the local IDA. The local IDA will determine if the raw image data associated with the requested images are stored as local data in the local repository (107). If the raw image data associated with the requested images are stored in the local repository (107), the local IDA will instruct the local IGP to generate the requested medical images using the local data. Because the local data may be data that is frequently used by the healthcare professionals, the raw image data associated with the requested medical image is highly likely to be stored as local data. This enables the healthcare facilities to reduce the downtime experienced caused by the disconnection from the cloud server (101).

Then, when the connection between the disconnected healthcare facility is reestablished with the cloud server (101), the local server (106) of the reconnected healthcare facility may be configured by the application to transmit to the cloud server (101) all the raw image data stored in the local repository (107) taken during the time of disconnection. Such raw image data may then be stored in the cloud repository (103) as new remote data. As the cloud server (101) is being updated with the raw image data from the reconnected healthcare facility, the local server (106) of the other in-network facilities may automatically update their respective local repositories (107) with the new remote data.

In one or more embodiments as shown in FIG. 1B, if the connection between the local computer (105) at in-network healthcare facilities with similar setup as Site B and the cloud server (101) is disconnected, the local computer (105) will not be able to retrieve any medical images from the cloud server (101).

Figure 2:
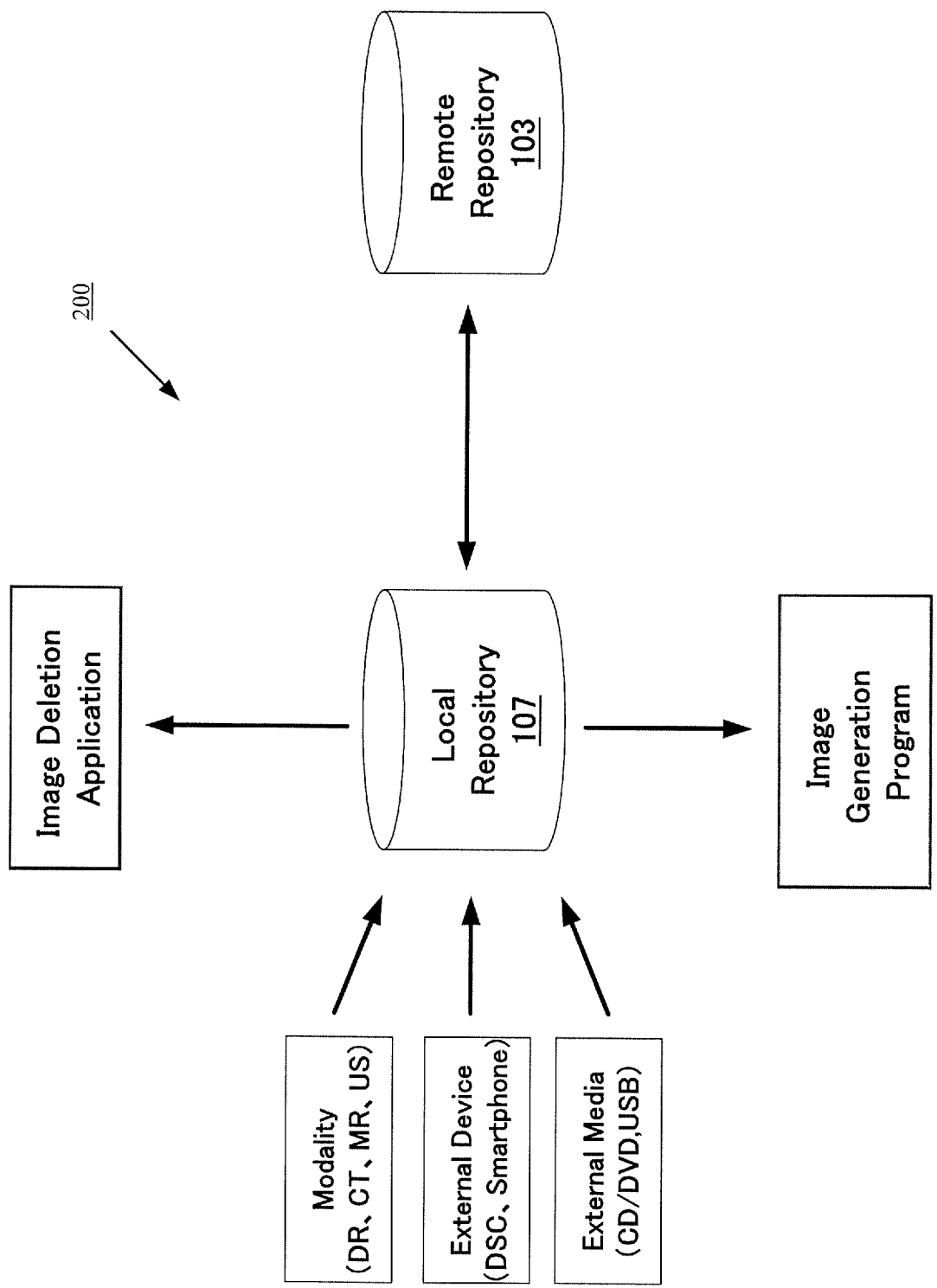
FIG. 2 shows a diagram in accordance with one or more embodiments.

FIG. 2 shows a diagram (200) depicting a data storage scheme of in-network healthcare facilities with similar setup as Site A as shown in FIG. 1A and FIG. 1B in accordance with one or more embodiments. As shown in FIG. 2, data from external local sources such as a modality, an external device such as a DSC, and a smartphone, and an external media such as a CD, DVD, and a USB are received by the local repository (107). The local repository (107) transmits all the received data to the cloud repository (103) to be stored as remote data. The local repository (107) may also receive remote data from the cloud repository (103) and store the remote data locally as local data.

In one or more embodiments, the local repository (107) is configured to provide the local IGP with raw image data. The local IGP receives the raw image data from the local repository (107) and generates a medical image to be displayed to the user (e.g., healthcare professionals) of the local computers (105) coupled to the local server (106). The local repository (107) is also configured to automatically delete specific local data that the user does not want stored locally using an image deletion application. The image deletion application may be configured by the user to easily manage the deletion of the local data stored in the local repository (107) based on the user's preferences.

FIG. 3 shows an example of a user interface (300) associated with the image deletion application in accordance with one or more embodiments. The user interface (300) is presented through a web-browser based application installed on the local computers (105) coupled to the local server (106). The user interface (300) is provided with multiple settings that can be modified by a user (e.g., healthcare professionals) of the local computers (105) coupled to the local server (106). The user may configure the settings on the user interface to set a preference for managing the automatic deletion of the local data stored in the local repository (107) on the local server (106).

In one or more embodiments, as shown in FIG. 3, the user interface (300) may include user configurable settings such as, but not limited to, an automatic deletion period setting, a modality type for auto delete setting, a setting for determining if bookmarked data should be excluded from deletion, a time to execute the image deletion setting, and a frequency of image deletion setting. The automatic deletion setting allows the user to delete all images with a time stamp that matches or exceeds the selected time period. The modality type for auto delete allows the user to delete local data that is associated with only the selected modalities. The time to execute image deletion and frequency of image deletion settings allows the user to set a time within the day and how often the automatic deletion function will be implemented.

In one or more embodiments, the setting for determining if bookmarked data should be excluded from deletion allows the user to prevent local data that have been specifically selected ("bookmarked") by the user from being automatically deleted even if the bookmarked data falls under one or more of the categories of the automatic deletion settings set by the user.

For example, if the user configures the user interface (300) settings as shown in FIG. 3, all local data with a time stamp of 3 months ago or longer associated with the DR and US modalities will be deleted at 1:00 every day with the exception of data bookmarked by the user. The local server (106) will continue to apply the same settings unless the user modifies and saves a new combination of settings.

In one or more embodiments, once the user has entered the desired settings, the user can save the settings for the local server (106) to implement the automatic deletion of the local data stored in the local repository. The user may bring up the user interface (300) and modify the settings at any time.

Figure 4:
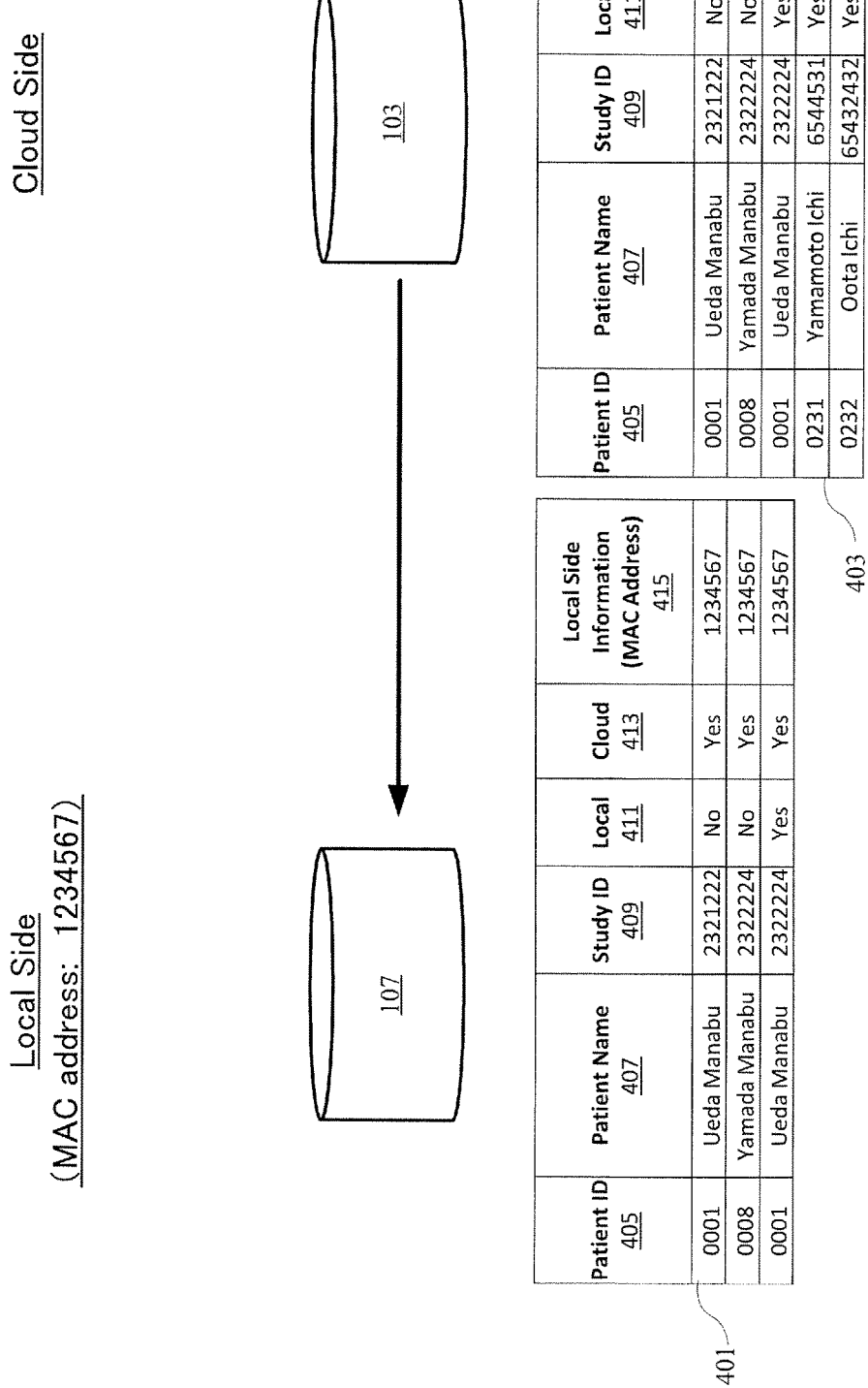
FIG. 4 shows a diagram in accordance with one or more embodiments.

FIG. 4 shows a diagram illustrating the update of information associated with the raw image stored in the cloud repository (103) in accordance with one or more embodiments. As shown in FIG. 4, the information associated with the raw image data is stored in a local data table (401) in the local repository (107) and in a remote data table (403) in the cloud repository (103). The local data table (401) and the remote data table (403) are compiled by the local server (106) and the cloud server (101), respectively, by extracting metadata embedded in the raw image data.

The data in the local data table (401) and the remote data table (403) may be sorted in any number of ways. In the example shown FIG. 4, the data is sorted by patient. However, the data can be sorted another way based, for example, on the preferences of the healthcare professionals.

In one or more embodiments, the local data table (401) and the remote data table (403) may include patient-related information such as, but not limited to, a Patient ID (405), Patient Name (407), Study ID (409), Local indicator (411), Cloud indicator (413), and local server (106) related information such as, but limited to, a Local Side Information (415) of the local server (106) coupled to the local computer (105).

In one or more embodiments, the Patient ID (405) is an individual's patient identification number. Each individual will have a single unique Patient ID (405). The individual's Patient ID (405) is shared among the in-network healthcare facilities. The Patient Name (407) is the legal name of the individual. The Study ID (409) is an identification number for the diagnosis conducted on the patient that is associated with the patient's medical diagnosis. Each individual who has received more than one diagnosis may be associated with multiple Study IDs (409).

In one or more embodiments, the Local indicator (411) and Cloud indicator (413) are identifiers that indicate if the raw image data associated with the Patient ID (405) or the Study ID (409) is available as local data, as remote data, or as both. For example, if a raw image data for an individual is only available as remote data, the Local indicator (411) will be a "NO" and the Cloud indicator (413) will be a "YES." In one or more embodiments, the Cloud indicator (413) is changed from "NO" to "YES" only when the transmission of the raw image data from the local server (106) to the cloud server (101) is complete.

In one or more embodiments, the Local PC Information (415) is the Media Access Control ("MAC") address associated with a local server (106). The local computers (105) coupled to the local server (106) of the same healthcare facilities may share the same MAC address as the local server (106). The local server (106) and local computers (105) of different healthcare facilities would have different MAC addresses.

As shown in FIG. 4, the information stored in the local data table (401) is updated with the information stored in the remote data table (403). The local data table (401) is only updated with information from the remote data table (403) associated with the same MAC address as the MAC address of the local server (106). The update of local data table (401) can be manually activated by the user (e.g., healthcare professionals) of the local computer (105) coupled to the local server (106). Additionally or alternatively, the update of the local data table (401) can be automatically activated by the local server (106) at predetermined intervals based on a user-set preference. This ensures that specific information of the raw image data stored in the local repository (107) will always be up-to-date with the information of the raw image data stored in the cloud repository (103).

Figure 5:
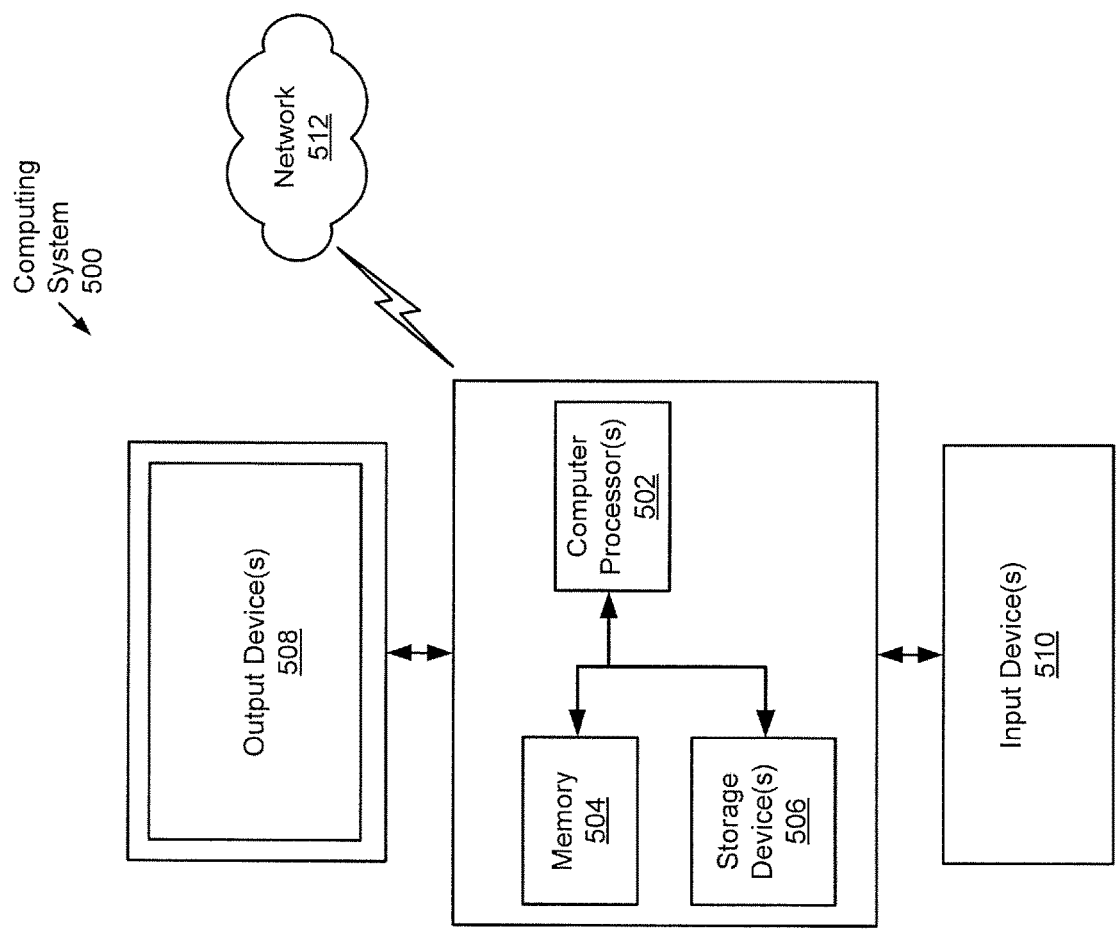
FIG. 5 shows a computing system in accordance with one or more embodiments.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) (502) may be one or more cores or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) (508) may be the same or different from the input device(s) (510). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

The computing system (500) of FIG. 5 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Figure 6:
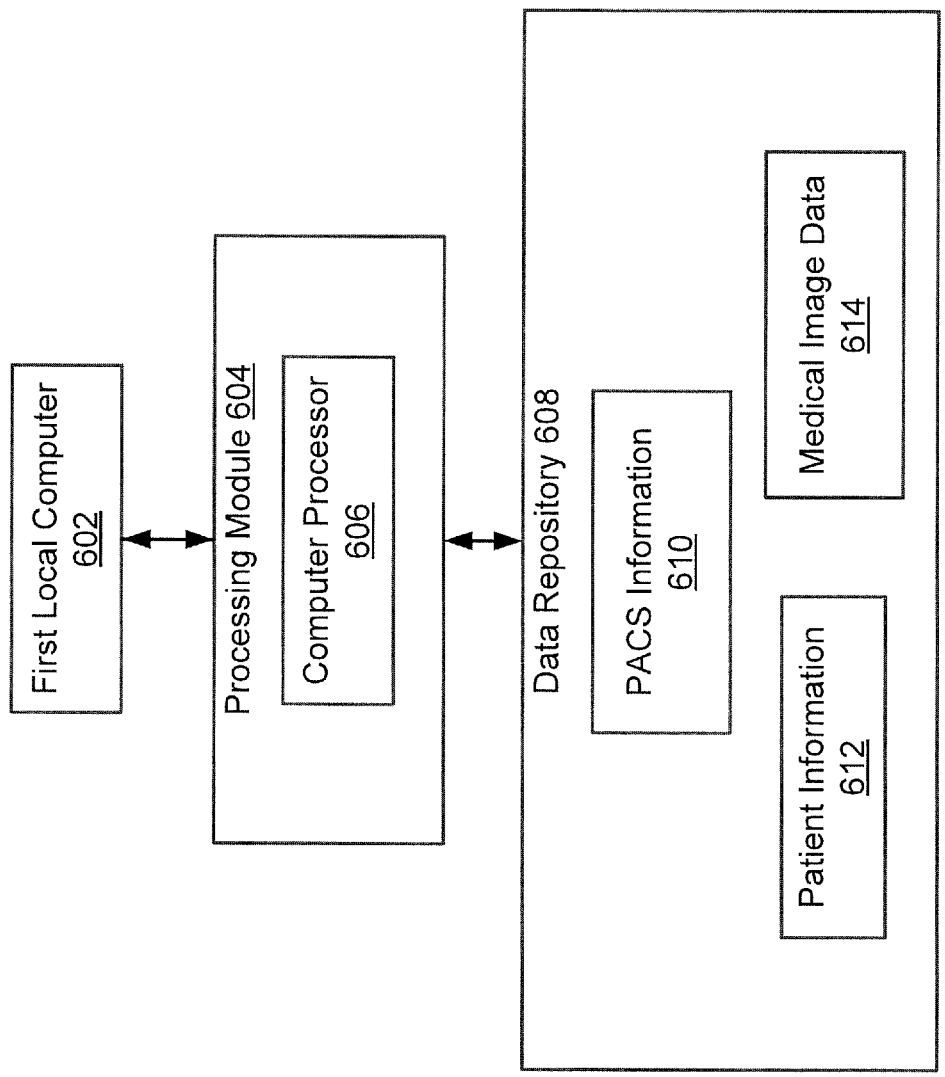
FIG. 6 shows a schematic diagram in accordance with one or more embodiments.

FIG. 6 shows a schematic diagram of a system in accordance with one or more embodiments. The system is configured for the exchange of medical data between a cloud repository on a cloud server and a plurality of local repositories on a plurality of local servers connected to the cloud server. The plurality of local servers comprises a first local server coupled to a first local computer (602) and the plurality of local repositories comprises a first local repository on the first local server. In one or more embodiments, the first local computer (602) may be the first local server.

As explained above, the use of ordinal numbers does not imply or create a particular ordering of the elements or limit any element to being only a single element. For example, the "first local computer" may be any local computer among the plurality of local computers connected to the cloud server and is merely called "first" for purposes of illustration.

The system as shown in FIG. 6 may include, for example, (i) a processing module (604) including a computer processor (606) configured to execute instructions configured to perform the following steps.

In one aspect, a method according to one or more embodiments causes a first local computer to transmit, in response to a request by a user to access a medical image associated with a predetermined patient, an image retrieval request to the cloud server. The image retrieval request is associated with the predetermined patient and causes the cloud server to determine whether raw image data associated with the image retrieval request is stored in the cloud repository or locally in the first local repository.

Further, based on the determination by the cloud server, the method according to one or more embodiments causes the first local computer to receive the medical image generated by the cloud server using the raw data if the raw image data is stored in the cloud repository, or receive an instruction from the cloud server to generate the medical image locally using the raw image data if the raw image data is stored on the first local repository. The medical image is then displayed to the user of the first local computer.

The system as shown in FIG. 6 further comprises (ii) the first local computer (602) configured to present the medical images and data to a user. The system may further include a data repository (608) configured to store application data (PACS data) (610) related to the vendor provided application, the patient information (612), and the medical images and data (614) that include the medical images and the raw image data.

Figure 7:
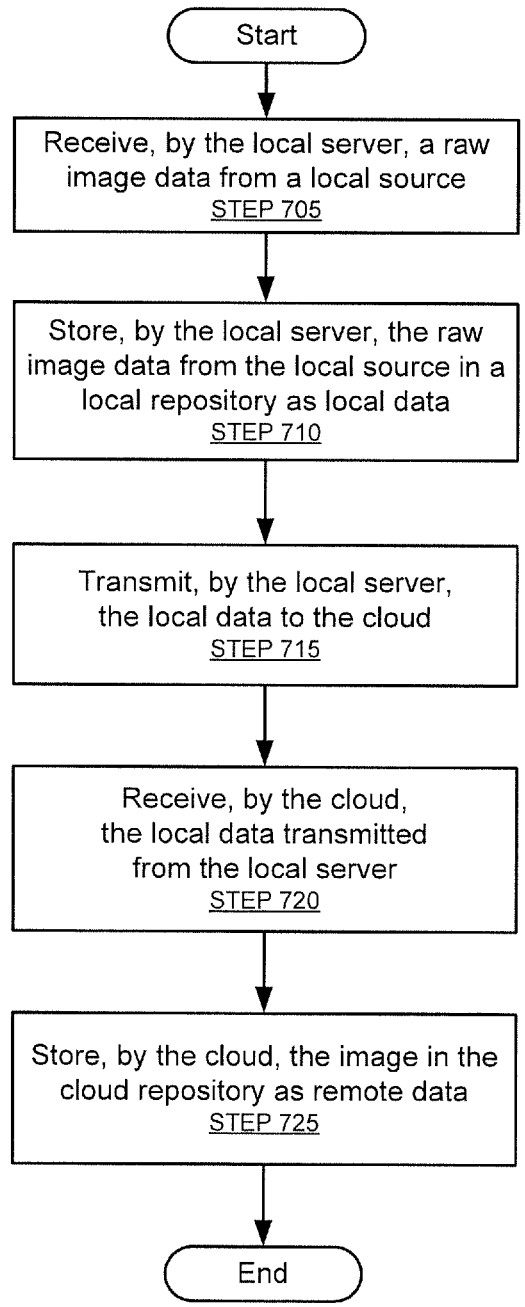
FIG. 7 shows a flowchart in accordance with one or more embodiments.

FIG. 7 shows a flowchart of a method in accordance with one or more embodiments. In one or more embodiments, the method as shown in FIG. 7 is a computer-implemented method. Each step shown in FIG. 7 is described with respect to only one healthcare facility among the multiple in-network healthcare facilities. It would be apparent to one of ordinary skill in the art that each step of the method described below can be performed by any of the in-network healthcare facilities. Further, although the method is described as being performed by a local server, it may also be performed by a local computer that is connected to the local server. In one or more embodiments, the local server itself may be the local computer, which may be the case for a small facility.

In Step 705, a local server for a healthcare facility receives raw image data from a local source. In one or more embodiments, the local source may be may be an imaging modality, an external device, or an external media such as a CD, DVD, USB, etc. The imaging modality may be any type of medical imaging device that is able to generate raw image data, such as DICOM-format data, that are used to generate medical images that provide a diagnosis of a patient. Examples of the imaging modality may be CT, MRI, PET, DR, US, X-ray, etc. The external device may be a device such as a DSC, a smartphone, etc.

In Step 710, the local server stores the image data received from the local source in a local repository as local data. In one or more embodiments, the local data stored in the local repository is later automatically deleted based on a preference set by the users at the local facility (e.g., healthcare professionals). The local data to be deleted may be dependent upon the importance of the data to the users or dependent upon the frequency of use of the local data. In one or more embodiments the deletion of the local data may occur directly after the local data has been transmitted.

In Step 715, the local server transmits the local data to a cloud server. In Step 720, the cloud server receives the local data transmitted from the local server, and in Step 725, the cloud server stores the local data in a cloud repository on the cloud server as remote data. In one or more embodiments, when the cloud server stores the local data in the cloud repository as remote data, the cloud server also updates a remote data table with information associated with the new remote data.

Figure 8:
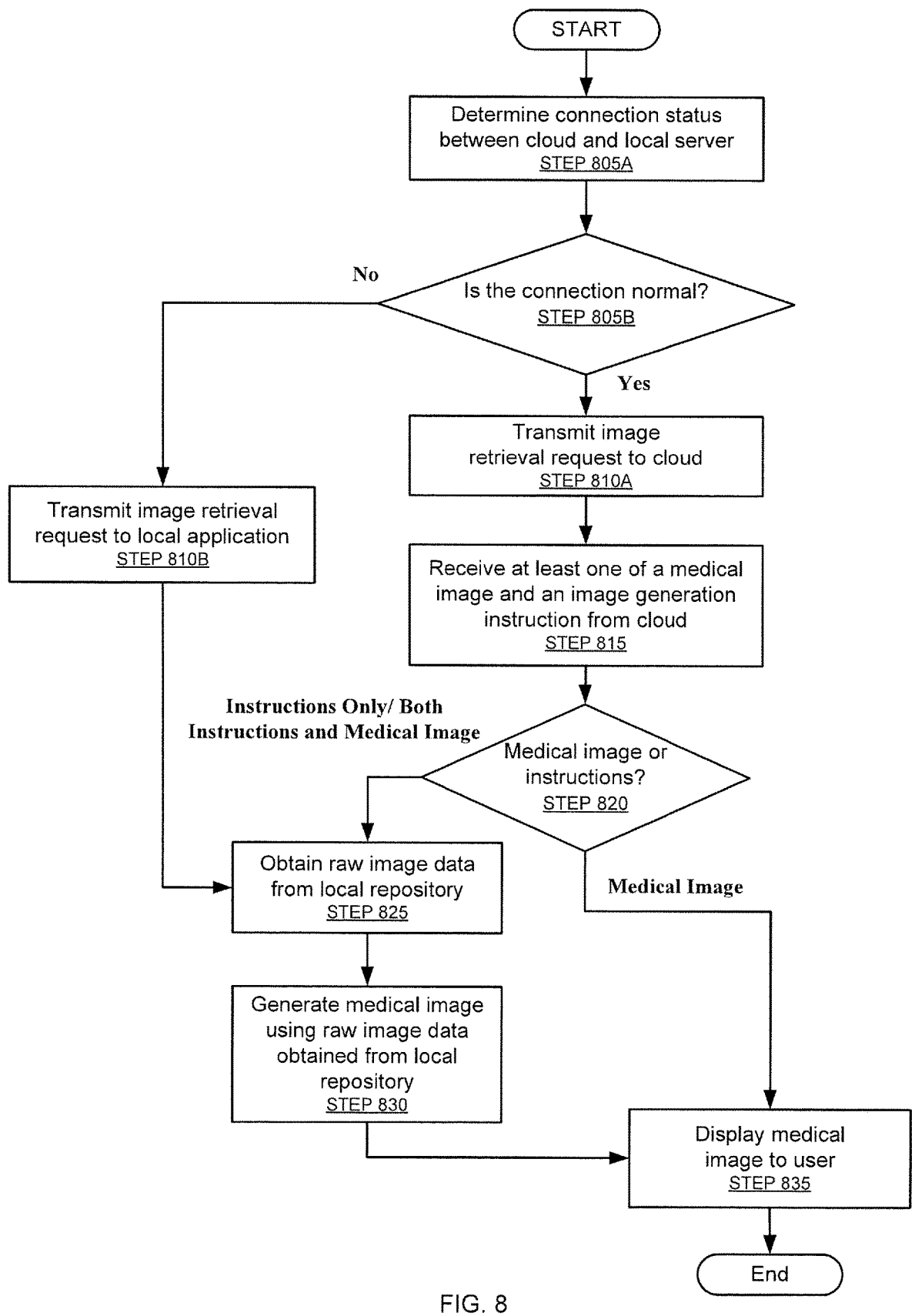
FIG. 8 shows a flowchart in accordance with one or more embodiments.

FIG. 8 shows a flowchart of a method in accordance with one or more embodiments. In one or more embodiments, the method as shown in FIG. 8 is a computer-implemented method. Each step shown in FIG. 8 is described with respect to only one healthcare facility among the multiple in-network healthcare facilities. It would be apparent to one of ordinary skill in the art that each step of the method described below can be performed by any of the in-network healthcare facilities. Further, although the method is described as being performed by a local server, it may also be performed by a local computer that is connected to the local server. In one or more embodiments, the local server itself may be the local computer.

In Steps 805A and 805B, a local server associated with one of the in-network healthcare facilities check the status of the connection between the local server and the cloud server on the cloud to determine if the connection is normal.

If the result of the check in Step 805B is YES, the local server transmits an image retrieval request in Step 810A to the cloud server. In one or more embodiments, the image retrieval request may be associated with the name of an individual patient ("predetermined patient"). The image retrieval request may contain a request for one or more medical images associated with the predetermined patient.

If the check in Step 805B is NO, then in Step 810B the local server transmits the image retrieval request to an image display application that is stored locally on the local server and proceeds to Step 825.

In Step 815, after the image retrieval request has been sent in Step 810A, the local server receives at least one of a medical image or an image generation instruction from the cloud. In one or more embodiments, the local server may receive both the medical image and the image generation instructions from the cloud. In one or more embodiments, the medical images received from the cloud server are medical images with raw image data that is only stored as remote data in a cloud repository on the cloud server.

In Step 820, the local server determines if the data received from the cloud server is a medical image, an image generation instruction, or both.

If the result of the check in Step 820 is INSTRUCTIONS ONLY or BOTH INSTRUCTIONS AND MEDICAL IMAGES, the local server proceeds to Step 825. In Step 825, the local server obtains raw image data associated with the requested medical image from the local repository and generates the requested medical image using a local image generation program with the raw image data in Step 830. The generated medical image is then displayed by the local server to the user along with any medical images received directly from the cloud server through a local computer coupled to the local server. In one or more embodiments, the local server may be the local computer.

In one or more embodiments, the medical images generated locally are different medical images associated with different raw image data from the medical images received directly from the cloud server. This enables the cloud server to offload burden and traffic associated with generating all the requested medical images from the different local servers to respective local devices that have the raw image data associated with the requested medical images stored as local data in the respective local repositories.

If the result of the check in Step 820 is MEDICAL IMAGE ONLY, the local server directly proceeds to Step 835 to display the requested medical image to the user through a local computer coupled to the local server. In one or more embodiments, the local server may be the local computer.

Figure 9:
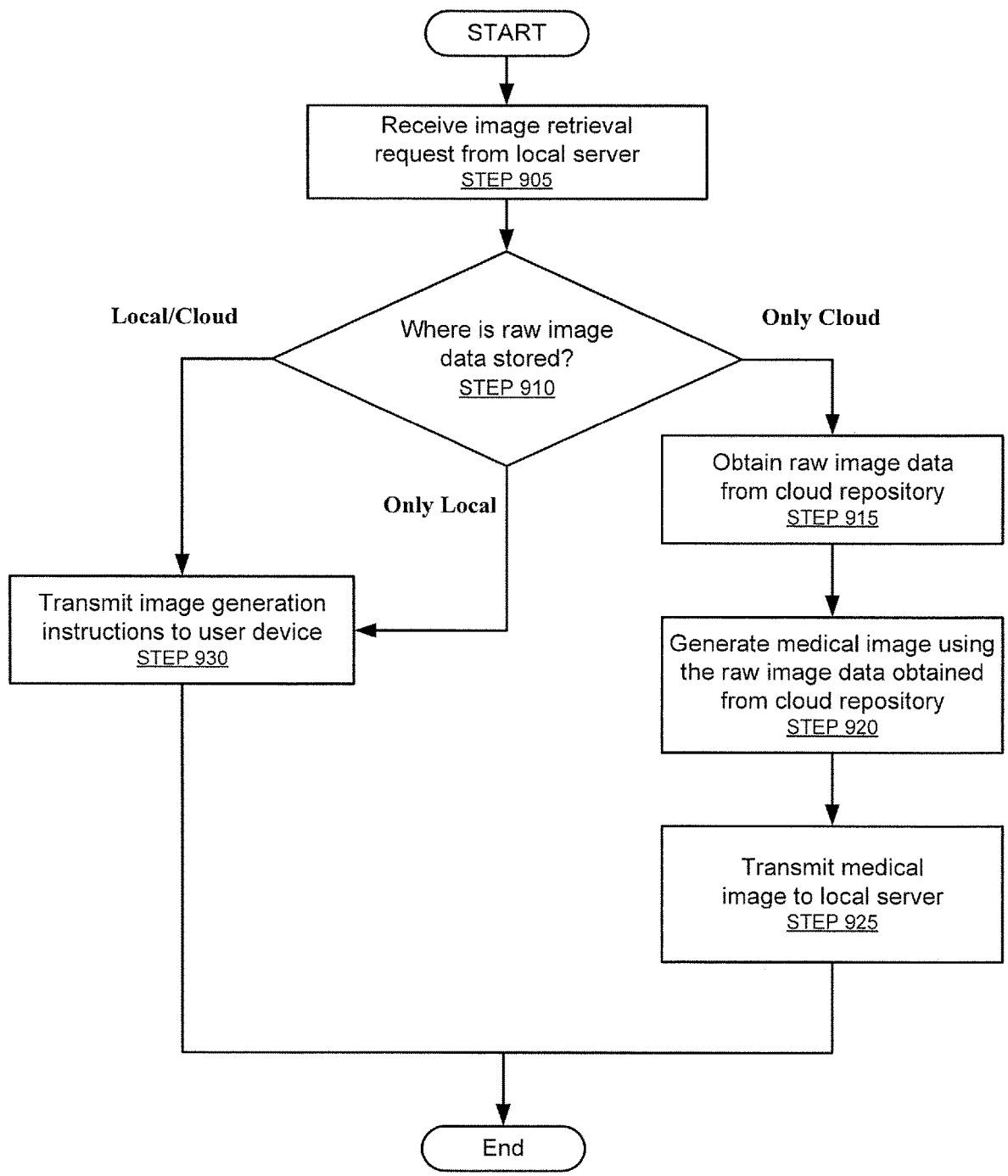
FIG. 9 shows a flowchart in accordance with one or more embodiments.

FIG. 9 shows a flowchart of a method in accordance with one or more embodiments. In one or more embodiments, the method as shown in FIG. 9 is a computer-implemented method. Each step shown in FIG. 9 is described with respect to only one healthcare facility among the multiple in-network healthcare facilities. It would be apparent to one of ordinary skill in the art that each step of the method described below can be performed by any of the in-network healthcare facilities. Further, although the method is described with respect to a cloud server and a local server, the method can also be implemented with respect to the cloud server and a local computer that is connected to the local server.

In Step 905, a cloud server associated with multiple in-network healthcare facilities receives an image retrieval request transmitted by a local server associated with one of the multiple in-network healthcare facilities. In one or more embodiments, a single image retrieval request may contain a request for more than one medical image. In one or more embodiments, the cloud server may simultaneously receive multiple image retrieval requests from the local server or from multiple local servers of different in-network healthcare facilities.

In Step 910, the cloud server determines, using an image display application stored in the cloud server ("remote IDA"), where the raw image data associated with the requested image is stored. In one or more embodiments, the image display application checks information stored in a remote data table within a cloud repository associated with the requested image for identifiers that indicate where the raw image data of the requested image is stored. In one or more embodiments, the raw image data of the requested image may be stored as a remote data in the cloud repository, as a local data in a local repository on the local server that sent the image retrieval request, or on both the remote and local repositories.

In Step 910, if the result of the check is BOTH LOCAL AND CLOUD or ONLY LOCAL, the cloud server transmits an image generation instruction to the local server in Step 930. In one or more embodiments, the image generation instruction is used to instruct the local server to generate the requested medical images with the local data stored in the local repository using a locally stored image generation program. This enables the cloud server to offload part of the burden and traffic associated with generating the requested medical images to respective local devices that have the raw image data associated with the requested medical images stored as local data in the respective local repositories.

In Step 910, if the result of the check is ONLY CLOUD, the remote IDA retrieves the raw image data stored in the cloud repository in Step 915.

In Step 920, the remote IDA instructs the cloud server to generate medical images with the raw image data obtained from the cloud repository using an image generation program stored on the cloud server.

In Step 925, the cloud server transmits the generated medical images to the respective local server that sent the image retrieval request.

Figure 10:
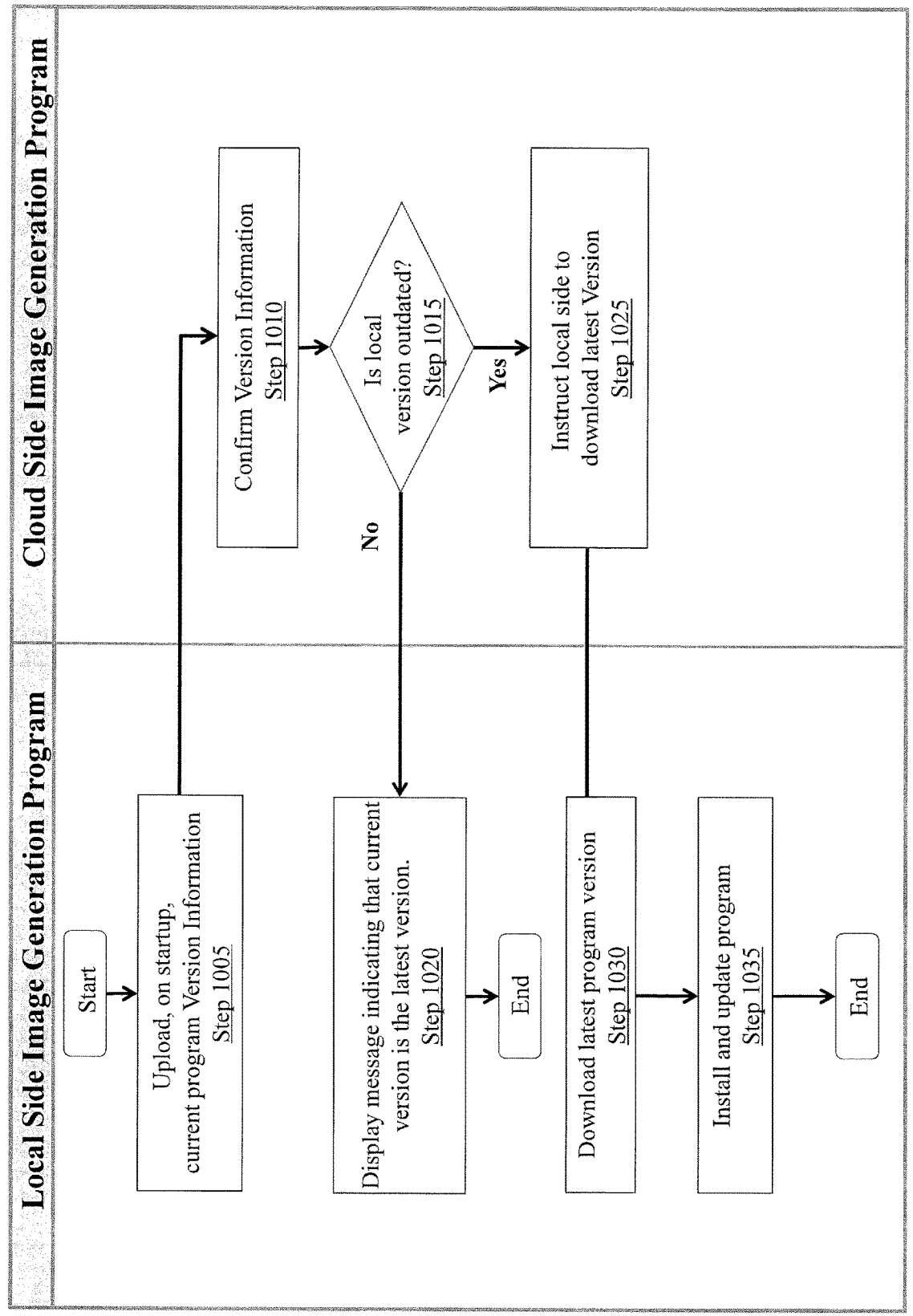
FIG. 10 shows a flowchart in accordance with one or more embodiments.

FIG. 10 shows a flow chart of a method in accordance with one or more embodiments. In one or more embodiments, the method as shown in FIG. 10 is a computer-implemented method. Each step shown in FIG. 10 is described with respect to only one healthcare facility among the multiple in-network healthcare facilities. It would be apparent to one of ordinary skill in the art that each step of the method described below can be performed by any of the in-network healthcare facilities. Further, although the method is described with respect to a cloud server and a local server, the method can also be implemented with respect to the cloud server and a local computer that is connected to the local server.

In Step 1005, a local server associated with one of the in-network healthcare facilities uploads, upon startup of an application of one or more embodiments, version information of the current version of a local IGP to a cloud server. In one or more embodiments, the application may be provided by a vendor or a third-party associated with a vendor.

In Steps 1010 and 1015, the cloud server receives the version information transmitted from the local server and determines if the current version of the local IGP is an older ("outdated") version of the image generation program.

In Step 1015, if the result of the check is NO, the cloud server proceeds to Step 1020 where the cloud server transmits an instruction to the local server to display a message to the user of the local server that indicates that the current version of the local IGP is the most up-to-date ("latest") version.

In Step 1015, if the result of the check is YES, the cloud server proceeds to Step 1025 and instructs the local server to download the latest version of the image generation program.

In Step 1030, upon receipt of the instructions from the cloud server, the local server downloads the latest version of the image generation program and proceeds to Step 1035 to install the latest version of the image generation program in order to update the outdated local IGP.

Figure 11:
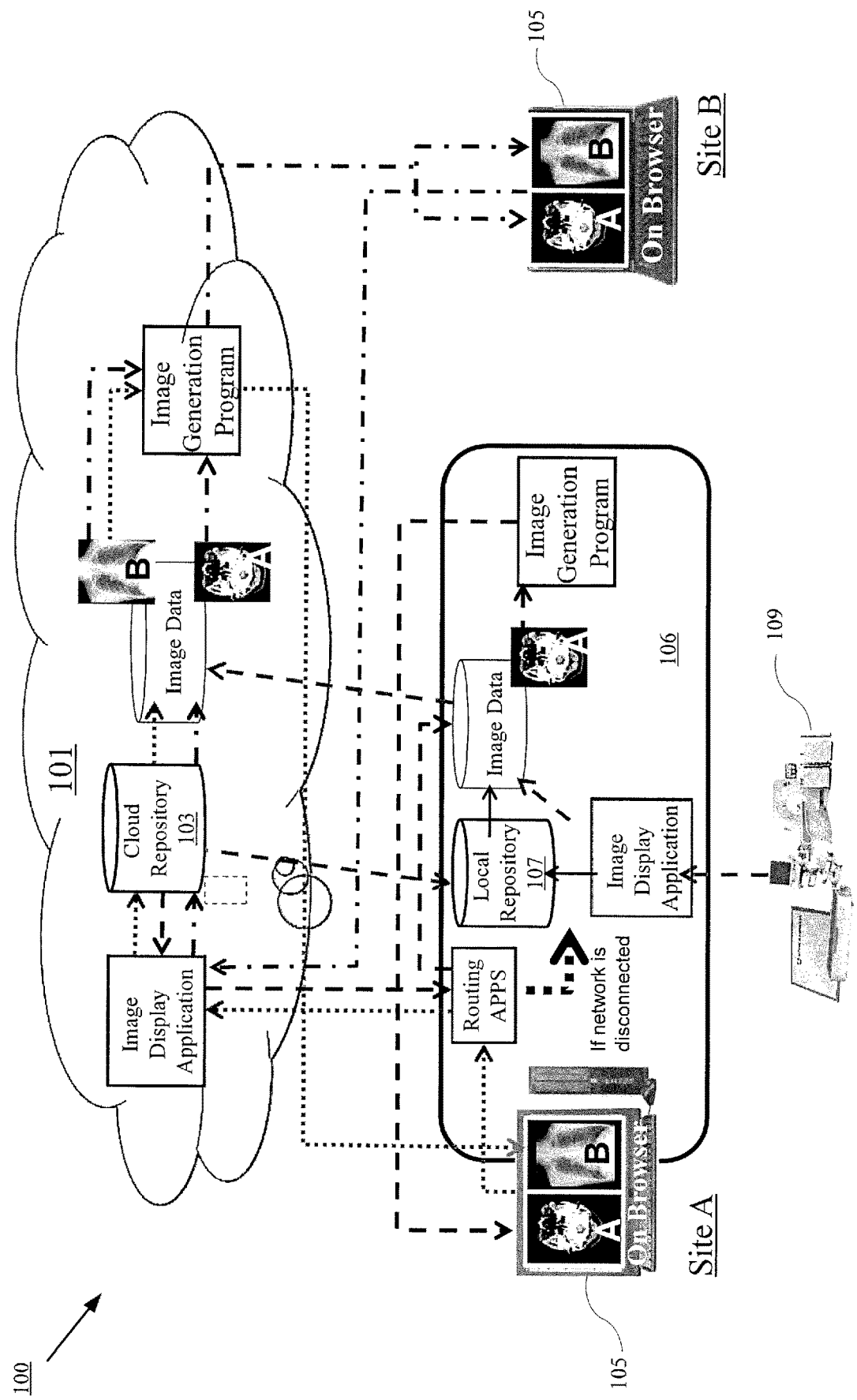
FIG. 11 shows one implementation of the system of FIGS. 1A and 1B in accordance with one or more embodiments.

FIG. 11 shows one implementation of the system of FIGS. 1A and 1B in accordance with one or more embodiments of the invention. As shown in FIG. 11, the local server (106) at Site A and the local computer (105) at Site B may transmit image retrieval request signals to the cloud server (101). In the example shown in FIG. 11, two medical images (medical images A and B) are being simultaneously displayed on a browser on each local computer (105).

In one or more embodiments, each arrow shown in FIG. 11 represents a signal/data being transmitted. The direction of the arrow illustrates the direction the signal/data is being transmitted. Further, signals that are related to the same request/data are illustrated with the same style.

For example, as shown in FIG. 11, according to one or more embodiments, the local computer (105) at Site B transmits an image retrieval request signal to the image display application on the cloud server (101). The image display application receives the image retrieval request signal and sends a raw image data (i.e., image data) retrieval signal to the cloud repository (103). The cloud repository (103) receives the signal from the image display application and transmits the image data of medical image A and medical image B to the image generation program on the cloud server (101) where the medical images are generated. The cloud server (101) then transmits the medical images A and B to the local computer (105) where the medical images A and B are displayed to the user.

As shown in FIG. 11, according to one or more embodiments, the two medical images A and B displayed on the local computer (105) of Site A is retrieved from two different locations, one (medical image A) locally from the local server (106) and the other (medical image B) remotely from the cloud server (101). Specifically, the local server (106) may have the image data for medical image A stored in the local repository (107). When the local computer (105) sends an image retrieval request for both medical images A and B to the cloud server (101), the cloud server (101) will only generate and transmit medical image B because the cloud server (101) is able to determine that the image data for medical image A is stored locally on the local server (106). The cloud server (101) will send an image generation instruction to the local sever (106) to generate medical image A locally using the image generation program stored on the local server (106). In one or more embodiments, the local sever (106) will not generate the same medical image as the medical image received from the cloud server (101) because the image data of the medical image received from the cloud server (101) is not available in the local repository (107). In one or more embodiments, if the cloud server (101) determines that the local repository (107) contains image data (e.g. image data for medical image A) associated with an image retrieval request, the cloud server (101) will not generate the medical image associated with that image data (i.e., medical image A).

One or more embodiments of the invention may have one or more of the following advantages: the ability to effectively provide a high and secure performance for the exchange of medical images between local servers with varying network connectivity in a high-traffic network environment; the ability to effectively utilize the storage space of the local repository by automatically deleting and storing data based on a data storage preference set by the user; the ability to offset the traffic from the cloud repository to provide high and stable performance to local servers with poor connectivity; the ability to automatically determine if the version of the local image generation program is outdated; the ability to automatically update the outdated local image generation program with the latest version of the program; etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to exchange medical data between a cloud repository on a cloud server and a plurality of local repositories on a plurality of local servers connected to the cloud server, wherein the plurality of local servers comprises a first local server and the plurality of local repositories comprises a first local repository on the first local server, the method comprising causing the first local server to:
   transmit, in response to a request by a user to access a medical image associated with a predetermined patient, an image retrieval request to the cloud server,
   wherein the image retrieval request is associated with the predetermined patient and causes the cloud server to determine whether raw image data associated with the image retrieval request is stored in the cloud repository or stored in the first local repository as local data;
   when determining that the raw image data is stored in only the cloud repository, receive the medical image that the cloud server generates using the raw image data stored in the cloud repository by a cloud image generation program stored in the cloud server;
   when determining that the raw image data is stored in both of the cloud repository and the first local repository, receive, from the cloud server, an instruction to generate the medical image locally using the raw image data stored in the first local repository;
   generate the medical image, using the raw image data stored in the first local repository as the local data, by a local image generation program stored in the first local server; and
   display the generated medical image on a display.

2. The method according to claim 1, wherein each of the plurality of local servers is coupled to a local computer.

3. The method according to claim 1, wherein
   the request by the user is a request to access a plurality of medical images, each associated with the predetermined patient or a different predetermined patient, and the method further comprises causing the first local server to:
       based on the determination by the cloud server, receive one of the plurality of medical images from the cloud server and receive the instruction from the cloud server to generate another of the plurality of medical images locally,
       wherein the medical image received from the cloud server and the medical image generated locally by the first local server are different medical images.

4. A method to exchange medical data between a cloud repository on a cloud server and a plurality of local repositories on a plurality of local servers connected to the cloud server, wherein the plurality of local servers comprises a first local server coupled to at least one of an external device, an external medium, and an imaging device, and the plurality of local repositories comprises a first local repository on the first local server, the method comprising causing the first local server to:
   obtain raw image data from the at least one of the external devices, the external medium, and the imaging device;
   transmit, in response to a request by a user to access a medical image associated with a predetermined patient, an image retrieval request to the cloud server, wherein the image retrieval request is associated with the predetermined patient and causes the cloud server to determine whether the raw image data associated with the image retrieval request is stored in the cloud repository or stored in the first local repository as local data;
   when the cloud server determines that the raw image data is stored in only the cloud repository, receive the medical image that the cloud server generates using the raw image data stored in the cloud repository by a cloud image generation program stored in the cloud server;
   when the cloud server determines that the raw image data is stored in both of the cloud repository and the first local repository, receive, from the cloud server, an instruction to generate the medical image locally using the raw image data stored in the first local repository without receiving the raw image data from the cloud server;
   generate the medical image, using the raw image data stored in the first local repository as the local data, by a local image generation program stored in the first local server; and
   display the generated medical image on a display.

5. The method according to claim 1, wherein the first local server transmits the raw image data to the cloud server to store the raw image data in the cloud repository.

6. The method according to claim 5, wherein the raw image data is stored in the first local repository or deleted from the first local server after the raw image data is transmitted to the cloud server based on a preference set by the user.

7. The method according to claim 1, wherein the raw image data is a Digital Imaging and Communications in Medicine Format (DICOM-format) image data that comprises a metadata.

8. The method according to claim 7, wherein the metadata of the raw image data includes a patient ID, a patient name, a study ID, a local indicator, a cloud indicator, and a local PC Information.

9. The method according to claim 8, wherein the local indicator and the cloud indicator contain information about a storage location of the raw image data, and the local PC information is a Media Control Access (MAC) address of the first local server.

10. The method according to claim 9, wherein
    the metadata of the raw image data is stored in a remote data table in the cloud repository, and a local data table in the first local repository is updated in a predetermined interval with the metadata stored in the remote information table associated with the MAC address of the first local server.

11. The method according to claim 1, wherein deletion of the raw image data stored in the local repository is automatically managed by the first local server based on a plurality of user-based settings.

12. The method according to claim 11, wherein the plurality of user-based settings comprises an automatic deletion period setting, a modality type for auto-delete setting, a setting for determining if bookmarked data should be excluded from deletion, a time to execute image deletion setting, and a frequency of image deletion setting.

13. The method according to claim 1, wherein the cloud repository on the cloud server is a database for a cloud-based Picture Archiving and Communication System (PACS).

14. The method according to claim 1, wherein a version of a local image generation program stored in the first local server is automatically updated based on a version of a remote image generation program stored in the cloud server.

15. A non-transitory computer-readable medium (CRM) storing instructions that cause a first local server coupled to a computer to perform an operation to exchange medical data between a cloud repository on a cloud server and a plurality of local repositories on a plurality of local servers connected to the cloud server, wherein the plurality of local servers comprises a first local server and the plurality of local repositories comprises a first local repository on the first local server, the operation comprising causing the first local server to:
    transmit, in response to a request by a user to access a medical image associated with a predetermined patient, an image retrieval request to the cloud server,
    wherein the image retrieval request is associated with the predetermined patient and causes the cloud server to determine whether raw image data associated with the image retrieval request is stored in the cloud repository or stored in the first local repository as local data;
    when determining that the raw image data is stored in only the cloud repository, receive the medical image that the cloud server generates using the raw image data stored in the cloud repository by a cloud image generation program stored in the cloud server;
    when determining that the raw image data is stored in both of the cloud repository and the first local repository, receive, from the cloud server, an instruction to generate the medical image locally using the raw image data stored in the first local repository;
    generate the medical image, using the raw image data stored in the first local repository as the local data, by a local image generation program stored in the first local server; and
    display the generated medical image on a display.

16. The CRM according to claim 15, wherein each of the plurality of local servers is coupled to a local computer.

17. The CRM according to claim 15, wherein
the request by the user is a request to access a plurality of medical images, each associated with the predetermined patient or a different predetermined patient, and
the first local server further:
    based on the determination by the cloud server, receives one of the plurality of medical images from the cloud server and receives the instruction from the cloud server to generate another of the plurality of medical images locally,
    wherein the medical image received from the cloud server and the medical image generated locally by the first local server are different medical images.

18. A system that exchanges medical data, comprising:
a local server connected to a cloud server; and
a local repository on the local server,
wherein the local server:
    transmits, in response to a request by a user to access a medical image associated with a predetermined patient, an image retrieval request to the cloud server,
    wherein the image retrieval request is associated with the predetermined patient and causes the cloud server to determine whether raw image data associated with the image retrieval request is stored in the cloud repository or stored in the local repository as local data;
    when determining that the raw image data is stored in only the cloud repository, receives the medical image that the cloud server generates using the raw image data stored in the cloud repository by a cloud image generation program stored in the cloud server;
    when determining that the raw image data is stored in both of the cloud repository and the first local repository, receives, from the cloud server, an instruction to generate the medical image locally using the raw image data stored in the first local repository;
    generates the medical image, using the raw image data stored in the first local repository as the local data, by a local image generation program stored in the first local server; and
    displays the generated medical image on a display.

19. The system according to claim 18, wherein the local server is coupled to a computer.

20. The system according to claim 18, wherein
the request by the user is a request to access a plurality of medical images, each associated with the predetermined patient or a different predetermined patient, and
the local server further:
    based on the determination by the cloud server, receives one of the plurality of medical images from the cloud server and receives the instruction from the cloud server to generate another of the plurality of medical images locally,
    wherein the medical image received from the cloud server and the medical image generated locally by the local server are different medical images.

* * * * *